April 14, 1953 E. C. McDANIEL 2,634,986
FRONT WHEEL DOLLY FOR TRAILERS
Filed Jan. 20, 1950 2 SHEETS—SHEET 1
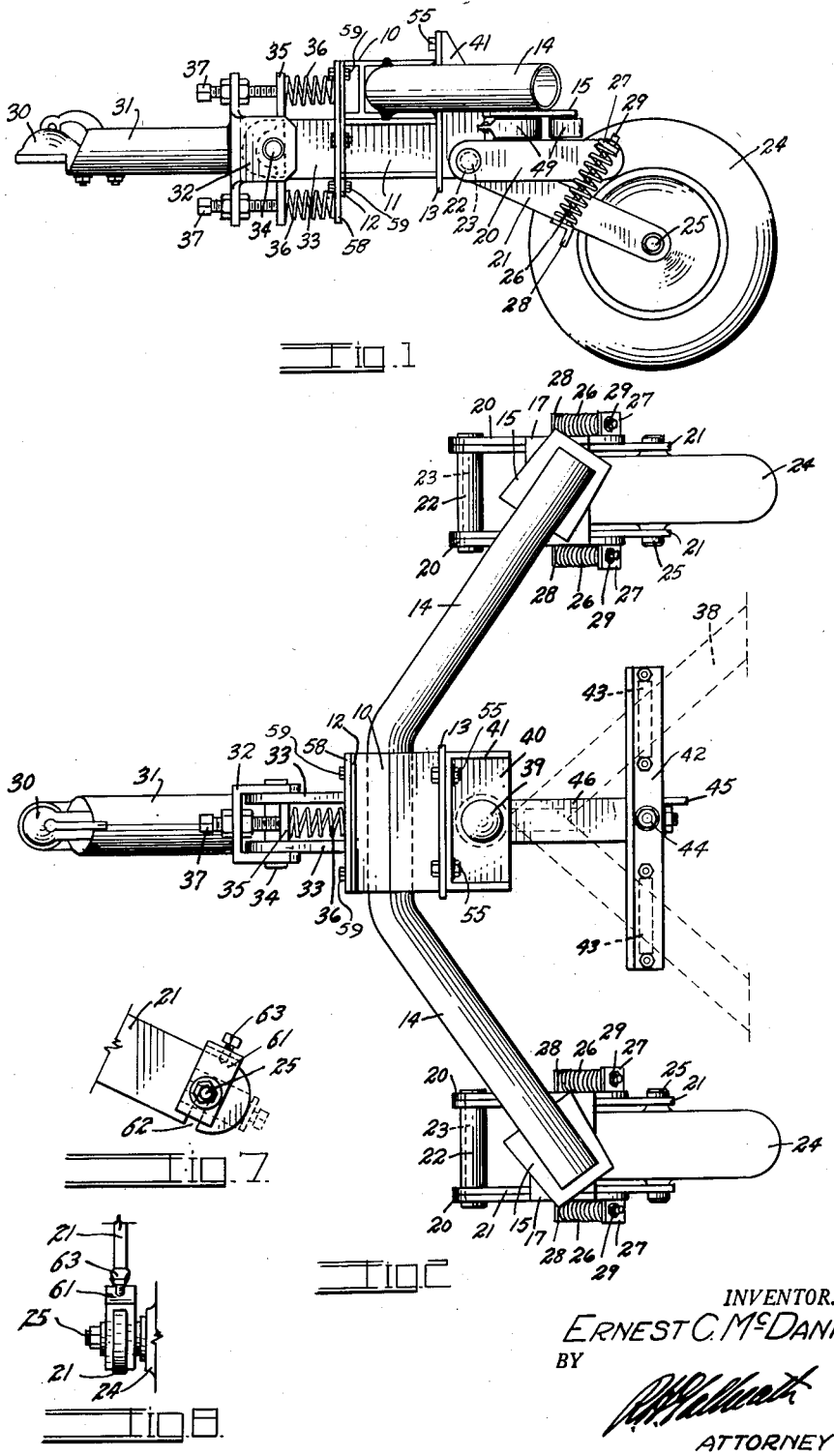
INVENTOR.
ERNEST C. McDANIEL
BY
ATTORNEY April 14, 1953     E. C. McDANIEL     2,634,986
FRONT WHEEL DOLLY FOR TRAILERS
Filed Jan. 20, 1950     2 SHEETS—SHEET 2
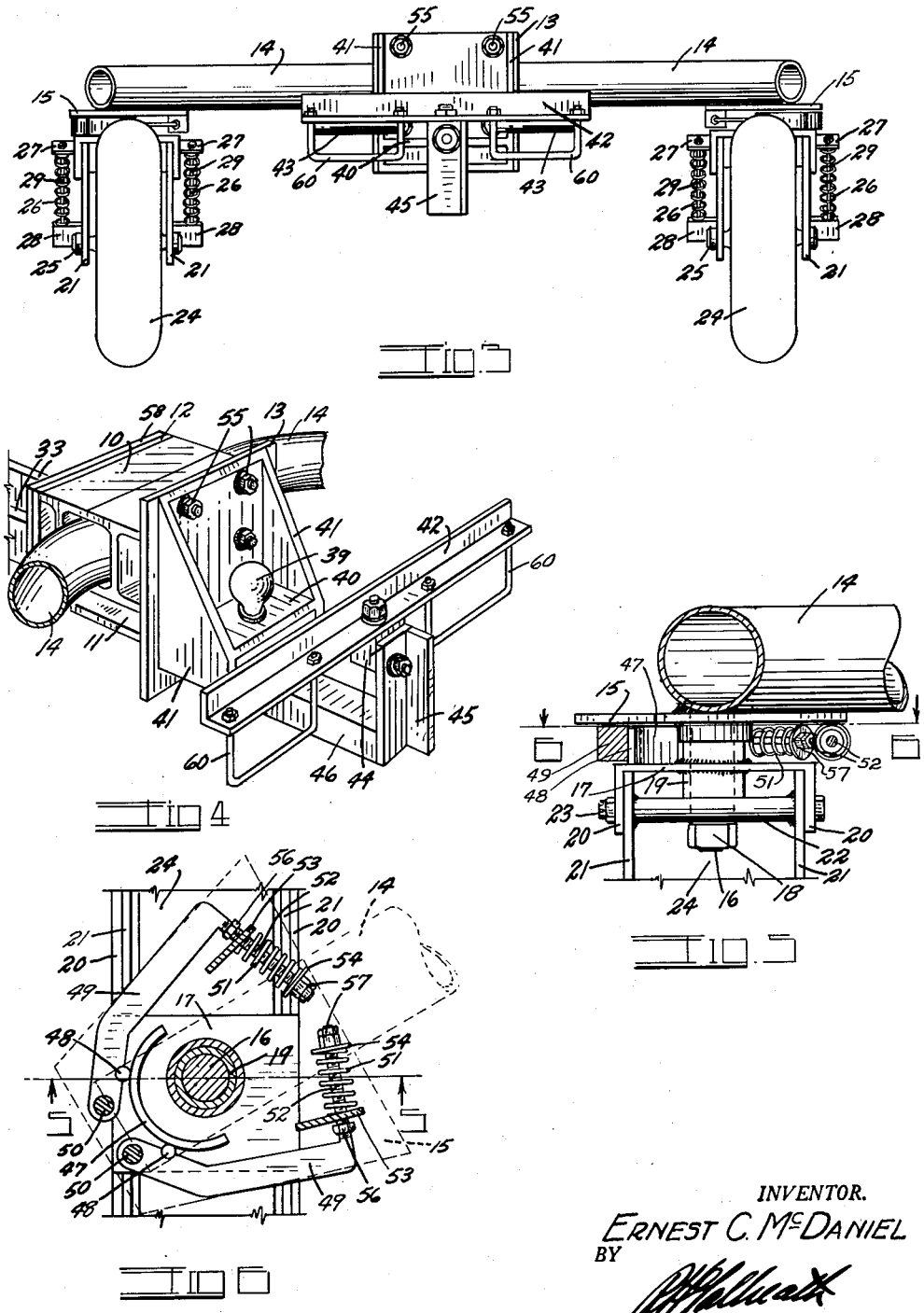
INVENTOR.
ERNEST C. McDANIEL
BY
ATTORNEY Patented Apr. 14, 1953

2,634,986

UNITED STATES PATENT OFFICE 2,634,986

FRONT WHEEL DOLLY FOR TRAILERS

Ernest C. McDaniel, Denver, Colo.

Application January 20, 1950, Serial No. 139,670

3 Claims. (Cl. 280—33.4)

This invention relates to a trailer dolly, that is, to a device to be positioned beneath the tongue of a trailer, more particularly a house trailer, for supporting and connecting the forward extremity of the latter to a tow car.

The principal object of the invention is to provide a front wheel house trailer dolly which will not swing, whip, or "fishtail" under high towing speeds.

Another object of the invention is to provide a dolly of the character described, which will relieve the weight on the tow car; which will cushion the vertical movement of the trailer relative to the tow car; and which can be adjusted to accommodate various heights of draw bars and towing balls on the tow car.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved front wheel house trailer dolly;

Fig. 2 is a plan view thereof;

Fig. 3 is a rear view thereof;

Fig. 4 is a fragmentary, detail, perspective view, illustrating the mid-frame portion of the improved trailer dolly;

Fig. 5 is a detail, fragmentary, enlarged cross-sectional view, taken on the line 5—5, Fig. 6;

Fig. 6 is a horizontal section, looking downwardly on the line 6—6, Fig. 5; and

Figs. 7 and 8 are detail views illustrating a construction for detachably mounting a wheel axle in the improved dolly.

The improved dolly comprises a central frame structure 10, preferably formed from two transversely extending I-beams mounted on a third longitudinally extending I-beam 11 and provided with a front plate 12 and a back plate 13 fixedly secured thereto. A cross frame is formed from a length of steel tubing 14 which extends between the I-beams of the frame 10 and is rigidly welded thereto.

The extremities of the tubing 14 extend oppositely outward from the frame 10 and incline rearwardly therefrom, as shown in Fig. 3. Each extremity of the tubing 14 is welded or otherwise secured to a horizontal turntable plate 15, from the middle of each of which a fixed caster wheel spindle 16 extends downwardly.

A cross plate 17 is welded or otherwise fixedly mounted on a bearing sleeve 19, and each bearing sleeve 19 is rotatably mounted on each of the spindles 16 and secured in place thereon by means of a suitable attachment nut 18. The sleeves 19 transfer the weight from the plate 15 to the plate 17. A side bar 20 extends downwardly from and along each side of each cross plate 17 and projects forwardly and rearwardly therefrom.

A wheel fork, consisting of two fork arms 21 permanently welded to a cross tube 22, is mounted between each pair of side bars 20 upon a suitable hinge pin 23. The hinge pin 23 extends through the cross tube 22, the latter providing a bearing for the fork on the pin. A caster wheel 24 is mounted between the fork arms 21 of each wheel fork upon a suitable axle 25.

Thus, it can be seen that the wheels 24 can swing upwardly and downwardly between the side bars 20 about the axes of the hinge pins 23.

The weight is transferred from the side bars 20 to the fork arms 21 by means of compression springs 26. The springs are positioned between spring pads 27 on the bars 20 and an angle bracket 28 projecting outwardly from each of the fork arms 21. The springs are maintained in alignment between the pads 27 and the brackets 28 by means of spring bolts 29 which slide through the brackets and through the pads 27.

The dolly is attached to the tow car by means of a conventional towing ball socket 30 which is secured in the forward extremity of a tubular tongue 31. The rear extremity of the tongue 31 is welded to a U-shaped tongue fitting 32. The tongue is secured to the frame 10 by bolting a spring plate 58 to the forward face of the front plate 12 by means of suitable bolts 59. A pair of parallel bracket arms 33 extend forwardly from the spring plate 58 and are hingedly connected between the sides of the U-shaped tongue fitting 32 by means of a cross pin 34.

A swinging plate 35 is tiltably mounted on the cross pin 34 and extends above and below the bracket arms 33. A pair of compression springs 36 are compressed between the plate 35 and the spring plate 58, there being one spring 36 above the arms 33 and another therebelow.

A set screw 37 is threaded through the tongue fitting 32 in axial alignment with each of the springs 36 and into contact with the swinging plate 35. By loosening the upper set screw 37 and tightening the lower set screw, the ball socket 30 can be raised, and by tightening the upper set screw 37 and loosening the lower set screw 37, the ball socket 30 can be lowered. Thus, the height of the ball socket can be varied to accommodate various heights of towing balls without affecting the balanced action of the springs 36. The springs 36 absorb all up and down movement of the forward portion of the trailer dolly so that these movements will not be transmitted to the tow car, and "galloping" or undulating movements are absorbed and minimized.

The tongue of the trailer, indicated in broken line at 38, is connected by means of the usual tow ball socket to a trailer ball 39 on the dolly. The trailer ball 39 is mounted on a ball shelf 40 in a ball bracket 41. The ball bracket 41 is bolted to the back plate 13 by means of suitable bolts 55.

The dolly is connected with the tongue 38 of the trailer by means of a cross angle 42 having rounded bearing members 43 which rest upon the tongue 38 of the trailer. The cross angle 42 is connected to the tongue 38 by means of suitable U-bolts 60. The cross angle is mounted on a universal joint block 44 pivoted on a vertical strut member 45 extending upwardly from a brace arm 46 welded beneath the ball bracket 41. Thus, any tendency of the dolly to tilt upwardly at the front will be resisted by the downward action of the cross angle 42 on the tongue 38. The ball 39 is positioned in axial alignment with the horizontal axis of the universal joint block 44 so that the normal tilting movements of the trailer are not restricted nor transferred to the dolly.

It can be readily seen that the above-described structure provides a spring-mounted dolly for supporting the front of a trailer, the tongue of which can be adjusted as to height to accommodate the particular tow car. It can also be seen that any upward and downward swinging movement of the trailer tongue or the trailer dolly is cushioned, absorbed, and balanced by the springs 36.

Means are provided for preventing sidesway or "fishtailing" of the caster wheel 24. This is accomplished by positioning a semi-circular cam 47 eccentrically upon the cross plate 17 about the spindle 16. Two bearing rollers 48 are positioned to ride against the surface of the cam 47. The bearing rollers 48 are mounted in clamping arms 49 which are hingedly mounted at their one extremities upon pivot pins 50 extending downwardly from the turntable plate 15.

The rollers 48 are constantly urged against the cam 47 by means of compression springs 51 which surround spring arms 52 extending from the swinging extremities of the clamping arms 49. The springs 51 act against abutments 53 projecting downwardly from the turntable plates 15 and against set washers 54 backed by set nuts 57 on the spring arms 52.

The position of the cam 47 relative to the position of the rollers 48 is such that when the trailer wheel is in the "straight ahead" trailing position, the two rollers 48 will be positioned equally on opposite sides of the point of greatest eccentricity of the cam 47 so that any movement of the cam in either direction about the axis of the spindle will necessitate compressing one of the springs 51. Thus, the cam will automatically center itself in the "straight ahead" position between the two rollers 48, and wobbling or "fishtailing" will be eliminated. Should the wheels be swung around as in backing the trailer, the cam 47 will move out of engagement with the rollers 48 so that the wheels will be free to follow the backing movements. The spring reaction is not sufficient to prevent the wheels from turning to follow normal road turns. This reaction will be removed, however, on abnormal turns, from 90° to 180°. The amount of inward movement of the clamping arms can be pre-set by means of stop nuts 56 threaded on the spring arms 52. The compression in the springs 51 can be adjusted by the set nuts 57.

It will be noted that a radial line drawn through the axis of the cam and the axis of the spindle will bisect the cam, and that this radial line is medially positioned between the two clamping arms when the wheels are trailing in the "straight ahead" position.

In a closed fork type of construction, it is necessary to withdraw the wheel axle 25 in order to remove the wheel 24 for tire repairs. This can be avoided by the construction shown in Figs. 7 and 8. In the latter construction the extremities of the wheel axle 25 are mounted in U-shaped clips 61 which fit over the extremities of the fork arms 21. The axle rests in upwardly extending notches 62 in the fork arms. The axle is installed by turning the clips 61 into longitudinal alignment with the fork arms 21, as shown in Fig. 7, and passing the axle extremities upwardly into the notches 62. The clips 61 are then rotated upwardly over the upper edges of the fork arms and secured in place by means of set screws 63. As the set screws are tightened, the axle will be tightly drawn into the extremities of the receiving notches 62.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A front wheel trailer dolly comprising: a main frame member; supporting arms extending outwardly and rearwardly from opposite sides of said frame member; a towing ball bracket extending rearwardly from said main frame member; a towing ball mounted on said bracket; a brace member extending forwardly from said main frame member; a horizontal cross pin supported by said brace member; a towing tongue hingedly mounted on said pin; a spring plate hingedly mounted on said pin and extending above and below said brace member; springs positioned between said main frame member and said spring plate above and below said hinge pin; set screws carried by said towing tongue and engaging said spring plate to adjust the angle of the former to the latter; and caster wheels mounted on the extremities of said arms.

2. A trailer dolly comprising: a central frame structure; a transverse frame rigidly secured at its middle to said central frame structure and extending sidewardly and rearwardly at both sides of said central frame structure; a caster wheel mounted below each extremity of said transverse frame; a vertical transverse spring plate secured on the front of said frame structure; a bracket arm structure extending forwardly from said plate; a horizontal hinge pin supported by said bracket arm structure; a tongue hingedly mounted on said hinge pin and extending forwardly therefrom; a tongue fitting on the rear extremity of said tongue and extending above and below the latter; compression springs positioned above and below said hinge pin and acting between said tongue fitting and said spring plate to resiliently maintain said tongue normally in horizontal alignment with said central frame structure; and a towing ball supported from and rearwardly of said central frame structure.

3. A trailer dolly as described in claim 2 having a brace arm extending rearwardly from said main frame structure below said towing ball; and a cross member supported above the rear extremity of said brace arm and being positioned to rest upon the tongue of a trailer when the latter is mounted on said towing ball.

ERNEST C. McDANIEL.

References Cited in the file of this patent

UNITED STATES PATENTS

| Number | Name | Date |
| --- | --- | --- |
| 2,350,624 | McDaniel | June 6, 1944 |
| 2,367,993 | Bishop | Jan. 23, 1945 |
| 2,447,659 | McDaniel | Aug. 24, 1948 |
| 2,458,666 | Williams | Jan. 11, 1949 |
| 2,496,515 | Bayes | Feb. 7, 1950 |
| 2,505,852 | Budnick et al. | May 2, 1950 |
| 2,529,769 | Hallewell | Nov. 14, 1950 |

FOREIGN PATENTS

| Number | Country | Date |
| --- | --- | --- |
| 230,654 | Great Britain | Mar. 19, 1925 |